(12) United States Patent
Ryu et al.

(10) Patent No.: US 12,090,017 B2
(45) Date of Patent: Sep. 17, 2024

(54) HANDPIECE HAVING ROOT CANAL LENGTH MEASUREMENT FUNCTION

(71) Applicants: META SYSTEMS CO., LTD, Seongnam-si (KR); METABIOMED CO., LTD., Cheongju-si (KR)

(72) Inventors: Hyun-seok Ryu, Sejong (KR); Myong-hyun Baek, Cheongju-si (KR)

(73) Assignees: META SYSTEMS CO., LTD, Seongnam-si (KR); METABIOMED CO., LTD., Cheongju-si (KR)

( * ) Notice: Subject to any disclaimer, the term of this patent is extended or adjusted under 35 U.S.C. 154(b) by 0 days.

(21) Appl. No.: 18/640,157

(22) Filed: Apr. 19, 2024

(65) Prior Publication Data
US 2024/0261077 A1    Aug. 8, 2024

Related U.S. Application Data

(63) Continuation of application No. PCT/KR2021/015635, filed on Nov. 2, 2021.

(30) Foreign Application Priority Data

Oct. 27, 2021    (KR) .......................... 10-2021-0144669

(51) Int. Cl.
*A61C 19/04* (2006.01)
*A61C 1/08* (2006.01)

(52) U.S. Cl.
CPC ............ *A61C 19/041* (2013.01); *A61C 1/088* (2013.01)

(58) Field of Classification Search
CPC ... A61C 19/041; A61C 19/042; A61C 19/043; A61C 19/00; A61C 19/04; A61C 1/088; A61C 5/42; A61B 17/1626; A61B 2090/309; A61B 90/35
See application file for complete search history.

(56) References Cited

U.S. PATENT DOCUMENTS

2019/0053884 A1*  2/2019  Langbein ................. A61C 5/44
2020/0155269 A1*  5/2020  Matoba .................... A61C 5/40

FOREIGN PATENT DOCUMENTS

| JP | 3049882 U | 6/1998 |
| JP | 2002-11025 A | 1/2002 |
| JP | 5349436 B2 | 11/2013 |

(Continued)

*Primary Examiner* — Jacqueline T Johanas
*Assistant Examiner* — Drew S Folgmann
(74) *Attorney, Agent, or Firm* — Bridgeway IP Law Group, PLLC; Jihun Kim

(57) ABSTRACT

A handpiece having a root canal length measurement function according to an exemplary embodiment may include: an angle having a portion made of a diffusion material for diffusing LED light from the LED light source, the portion including one side provided with a root canal treatment file for removing dental pulp inside the root canal and for expanding the root canal; a lip hook provided such that same can be cradled on the subject's lips; a body portion electrically connected to the file through a first terminal connector, into which a first terminal provided on the other side of the angle is to be inserted, and electrically connected to the lip hook through a second terminal connector, into which a second terminal of the lip hook is to be inserted; and an LED light source for emitting LED light from one end of the body portion.

4 Claims, 5 Drawing Sheets

(56) References Cited

FOREIGN PATENT DOCUMENTS

| | | | |
|---|---|---|---|
| JP | 2020-531118 | A | 11/2020 |
| KR | 10-0159070 | B1 | 12/1998 |
| KR | 10-0956678 | B1 | 5/2010 |
| KR | 10-2146179 | B1 | 8/2020 |

* cited by examiner

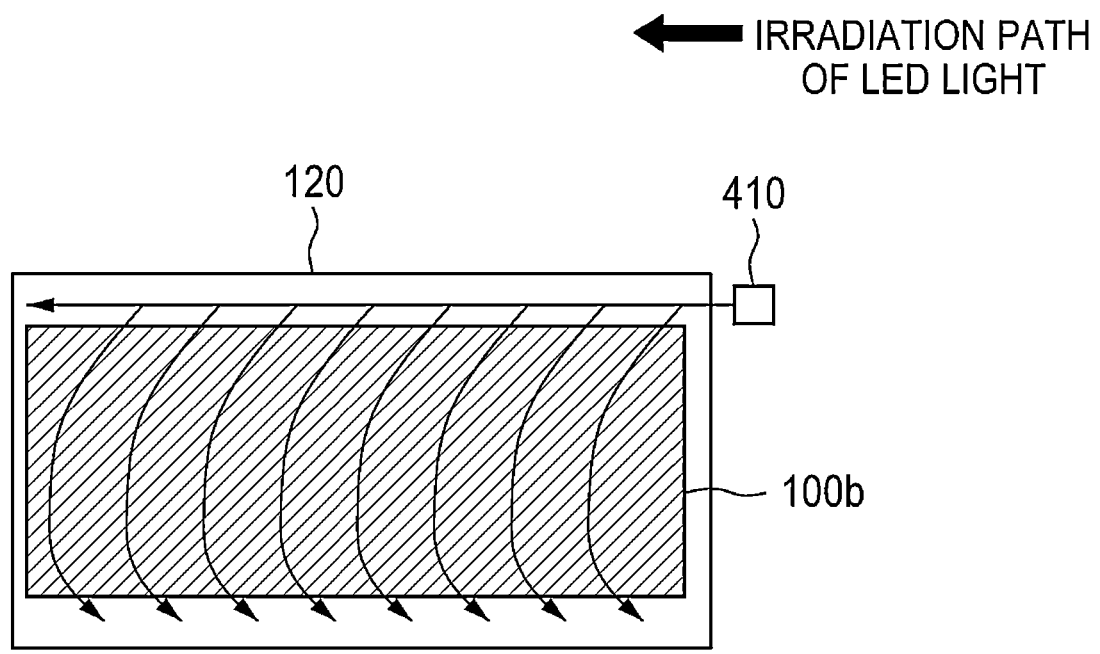
FIG. 2
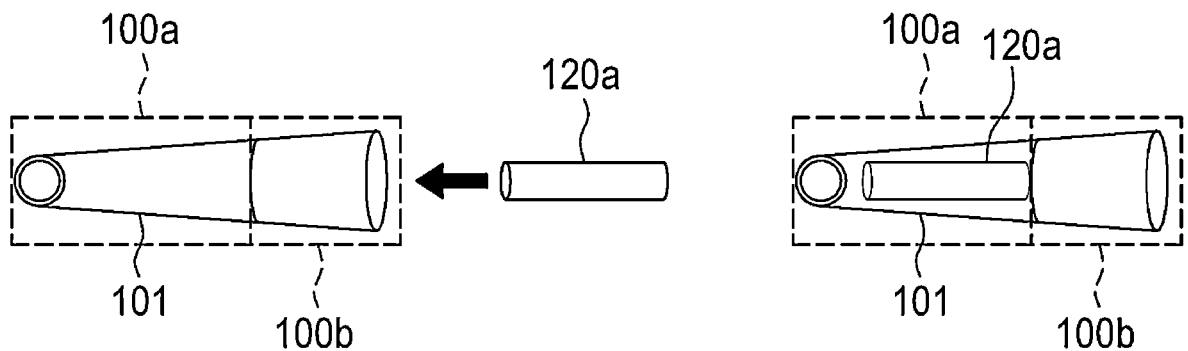
FIG. 3A
FIG. 3B

HANDPIECE HAVING ROOT CANAL LENGTH MEASUREMENT FUNCTION

CROSS-REFERENCE TO RELATED APPLICATIONS

This application is a continuation application of PCT International Application No. PCT/KR2021/015635 filed on Nov. 2, 2021, which claims the priority of Korean Patent Application No. 10-2021-0144669 filed on Oct. 27, 2021, the disclosure of which is incorporated herein by reference.

TECHNICAL FIELD

The present invention relates to a handpiece with a root canal measurement function, and more particularly, to a handpiece with a root canal measurement function, in which an operator may confirm a measurement result of a root canal length by using a color change of an LED light source.

BACKGROUND ART

Inside the tooth, there is a tissue called dental pulp, and this dental pulp is composed of nerves, blood vessels, and the like, so the dental pulp supplies nutrients, moisture, and the like to the tooth and performs the function of feeling sensation. When the dental pulp becomes infected and inflamed due to cavities, etc., it is called dental pulpitis, and the dental pulpitis also causes inflammation in the periapical tissue of the root of the tooth.

At this time, the treatment performed is called root canal treatment (or endodontic treatment). In other words, the root canal treatment is a procedure that completely removes infected dental pulp tissue using special instruments such as cutting tools, disinfects the root canal to make it sterile, and then fills the space occupied by the dental pulp using materials suitable for living organisms.

In addition, the root canal treatment is performed up to the apical stenosis of the root canal, but since this apical stenosis is not visible to the eye, a root canal length measurer that electrically detects the location of the apical stenosis must be equipped.

The root canal length measurer generally uses the electrical resistance of the human body to measure the length of the root canal through the device reaching the periapical tissue. This method is made by considering that the moment at which when a conductive wire that connects the person's lips and the apical periodontal ligament is created, and a current of a certain intensity is passed through the conductive wire, the resistance reaches a certain value as a cutting tool such as a file or reamer enters the root canal is a dental root end.

The conventional root canal length measurer is provided in the form of a terminal and measures the length of the root canal while placed on the table of a unit chair installed in a dental office or on a separate table.

However, when using a conventional root canal length measurer, a separate process of checking the root canal length measurement result through a display device is required, which is cumbersome and prolongs the procedure time, and the operator's sight should be repeatedly moved to observe the patient's affected area and view a display provided in the root canal length measurer, so there is a problem that a stable procedure is not easy.

PRIOR ART DOCUMENT

Patent Document (Patent Document 1) Japanese Patent Registration No. 5349436
(Patent Document 2) Japanese Patent Publication No. 2002-11025

DISCLOSURE

Technical Problem

Therefore, the present invention is contrived to solve the above problems, and an object of the present invention is to provide a handpiece with a root canal length measurement function, in which an LED light source is configured in a body portion, and a diffusion material for diffusing an LED light of an LED light source is inserted into an angle to be coupled to the body portion, so that an operator may check a root canal length measurement result through the angle.

Further, an object of the present invention is to provide a handpiece with a root canal length measurement function, which is equipped with an LED module into which the LED light source is inserted into the angle and the body portion, and the operator may check the measurement result of the root canal length through a color change of the LED light source, which occurs as an equalizer type or an overall color change type.

However, technical objects to be achieved by the present invention are not limited to the aforementioned technical objects, and other technical objects not described above may be evidently understood by a person having ordinary skill in the art to which the present invention pertains from the following description.

Technical Solution

In order to achieve the objects, according to an exemplary embodiment of the present invention, a handpiece with a root canal length measurement function, which may include: an angle having a portion made of a diffusion material for diffusing an LED light from an LED light source, the portion including one side provided with a root canal treatment file for removing dental pulp inside a root canal and for expanding the root canal; a lip hook provided such that the lip hook can be cradled on the subject's lips; a body portion electrically connected to the file through a first terminal connector, into which a first terminal provided on the other side of the angle is to be inserted, and electrically connected to the lip hook through a second terminal connector, into which a second terminal of the lip hook is to be inserted; and an LED light source for emitting LED light from one end of the body portion, and in which the body portion may include multiple connectors for electrically connecting a battery and the LED light source, the file and the lip hook; and a control module for controlling operations of the battery such that the color of LED light emitted by the LED light source changes according to position information and length information of a dental root end, which are acquired by measuring an impedance value that varies as the file approaches from the tooth surface to the dental root end.

Further, according to another exemplary embodiment of the present invention, a handpiece with a root canal length measurement function, which may include: an angle having one side provided with a root canal treatment file for removing dental pulp inside a root canal and for expanding the root canal; a lip hook provided such that the lip hook can be cradled on the subject's lips; an LED module provided with an LED light source; and a body portion electrically connected to the file through a first terminal connector, into which a first terminal provided on the other side of the angle is to be inserted, and electrically connected to the lip hook through a second terminal connector, into which a second terminal of the lip hook is to be inserted, and electrically connected to the LED module through a third terminal connector, into which a third terminal of the LED module is to be inserted, and the body portion may include multiple connectors for electrically connecting a battery and the LED light source, the file and the lip hook; and a control module for controlling operations of the battery such that the color of LED light emitted by the LED light source changes according to position information and length information of a dental root end, which are acquired by measuring an impedance value that varies as the file approaches from the tooth surface to the dental root end.

Advantageous Effects

The present invention has an advantage of improving the stability and precision of a procedure while reducing the operator's tension and fatigue because the operator can visually know the measurement result of the root canal length through the color change of the LED light during the root canal treatment process.

In addition, the present invention has an advantage of simplifying the configuration of the device for root canal treatment because the measurement result of the root canal length may be visually expressed through stepwise changes in LED light, so there is no need for a separate display device.

In addition, the present invention has an advantage of improving the operator's convenience because the operator may operate the LED light source through the gripping method of a general handpiece in which the operator holds the angle with the thumb, index finger, and middle finger during the root canal treatment process through an LED module equipped with an LED light source.

However, effects which can be obtained in the present invention are not limited to the aforementioned effects and other unmentioned effects will be clearly understood by those skilled in the art from the following description.

DESCRIPTION OF DRAWINGS

FIG. 2 is an explanatory diagram for describing a diffusion method of an LED light by a diffusion material illustrated in FIG. 1.

FIG. 3 is an explanatory diagram for describing a diffusion material whose design is changed in FIGS. 1 and 2.

DESCRIPTION OF MAIN REFERENCE NUMERALS OF DRAWINGS

Figures 1A, 1B:
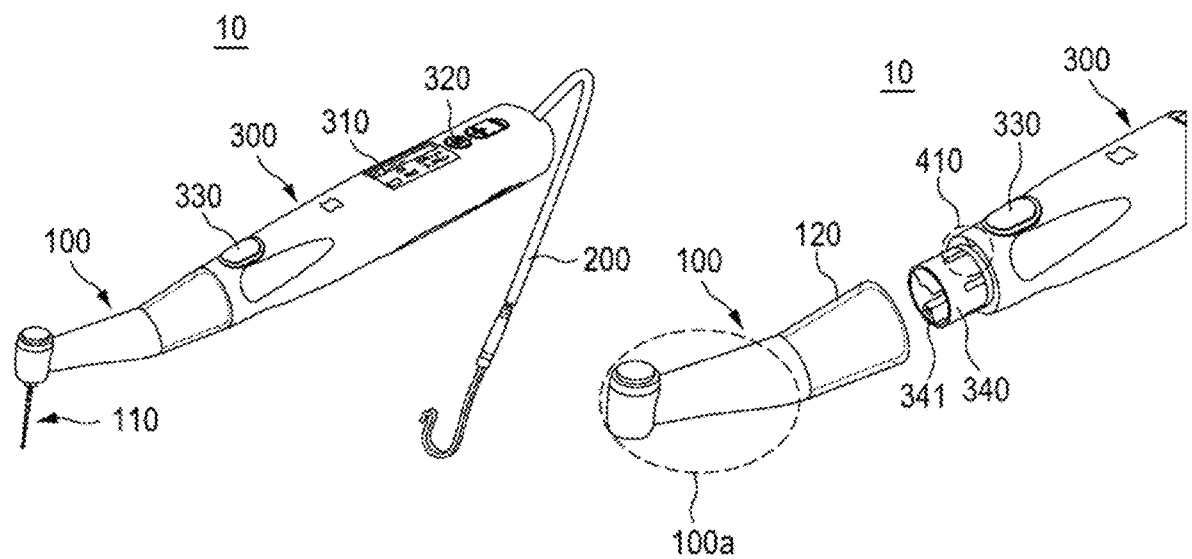
FIG. 1 is a conceptual view of a handpiece with a root canal length measurement function according to an exemplary embodiment of the present invention.

10: Handpiece
100: Angle
100*a*: Portion of angle
100*b*: The other portion of angle
101: Cover
110: File
120, 120*a*: Diffusion material
200: Lip hook
300: Body portion
310: Display device
320: First switch
330: Second switch
340: Protruding member
341: First terminal connector
343: Third terminal connector
400: LED module
405: Main body
410: LED light source
415: Panel
420: Operating switch
430: Band portion
440: Third terminal Mode for Invention Hereinafter, an exemplary embodiment of the present invention will be described in detail so as to be easily implemented by those skilled in the art, with reference to the accompanying drawings. However, a description of the present invention is merely an exemplary embodiment for a structural or functional description and the scope of the present invention should not be construed as being limited by an exemplary embodiment described in a text. That is, since the exemplary embodiment can be variously changed and have various forms, the scope of the present invention should be understood to include equivalents capable of realizing the technical spirit. Further, since it does not mean that a specific exemplary embodiment should include all objects or effects or include only the effect, it should not be understood that the scope of the present invention is limited by the object or effect.

Meanings of terms described in the present invention should be understood as follows.

The terms "first," "second,", and the like are used to differentiate a certain component from other components, but the scope should not be construed to be limited by the terms. For example, a first component may be referred to as a second component, and similarly, the second component may be referred to as the first component. It should be understood that, when it is described that a component is "connected to" another component, the component may be directly connected to another component or a third component may be present therebetween. In contrast, it should be understood that, when it is described that a component is "directly connected to" another component, it is understood that no component is present between the component and another component. Meanwhile, other expressions describing the relationship of the components, that is, expressions such as "between" and "directly between" or "adjacent to" and "directly adjacent to" should be similarly interpreted.

It is to be understood that the singular expression encompasses multiple expressions unless the context clearly dictates otherwise and it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

If it is not contrarily defined, all terms used herein have the same meanings as those generally understood by those skilled in the art. Terms which are defined in a generally used dictionary should be interpreted to have the same meaning as the meaning in the context of the related art, and are not interpreted as an ideal meaning or excessively formal meanings unless clearly defined in the present invention.

A handpiece 10 with a root canal length measurement function according to an exemplary embodiment of the present invention (hereinafter, referred to as 'handpiece 10') is a device that allows an operator to visually measure a root canal length during root canal treatment, which enables a procedure to be performed stably in a short period of time, and components provided for this are as follows.

FIG. 1 is a conceptual view of a handpiece with a root canal length measurement function according to an exemplary embodiment of the present invention.

Referring to FIG. 1, the handpiece 10 includes an angle 100, a lip hook 200, a body portion 300, and an LED light source 410.

The angle 100 is equipped with a root canal treatment file 110 for removing a dental pulp within a root canal and expanding the root canal on one side.

The file 110 is divided into manual files and electric files, and the manual files for enlarging and deleting the root canal by the operator's hands are divided into K-File, H-file, Broach, Ni—Ti (nickel-titanium alloy), etc., and most of the electric files that use rotational force of an engine provided inside the handpiece 10 and the angle 100 of an exemplary embodiment are divided into an Ni—Ti material.

In the present invention, the file 110 will be described based on the fact that the file is the electric file, and it is preferable that the engine for providing the rotational force to the file 110 is inserted into the angle 100.

The angle 100 is provided with not only the file 110 but also a diffusion material 120 for diffusing the LED light of the LED light source 410.

The material of the diffusion material 120 is not limited as long as the diffusion material 120 diffuses (or transmits) the LED light of the LED light source 410, and the form for being provided in the angle 100 of the present invention is as follows.

FIG. 2 is an explanatory diagram for describing a diffusion method of an LED light by a diffusion material illustrated in FIG. 1.

Referring to FIG. 2, the diffusion material 120 is provided in a form that surrounds the other portion 100b of the angle in contact with a portion 100a of the angle, and an insertion groove is formed to be spaced apart from the other portion 100b of the angle to secure an irradiation path of the LED light irradiated from the LED light source 410.

The LED light irradiated from the LED light source 410 may be diffused on the other portion 100b of the angle through the insertion groove of the diffusion material 120, and through this, the operator views the other portion 100b of the angle viewed during root angle treatment without moving his/her sight to a separate display device during root canal treatment to determine a length of the root canal through the angle 100.

The diffusion material 120 is not limited to the form illustrated in FIG. 2, but may be easily design-changed by a designer, and a design change example of the diffusion material 120 is as follows.

FIG. 3 is an explanatory diagram for describing a diffusion material whose design is changed in FIGS. 1 and 2.

Referring to FIG. 3, a diffusion material 120a, whose design is changed from the form illustrated in FIGS. 1 and 2, is provided in a bar shape to be inserted into the angle 100 through the other side of the angle 100, and may be exposed through a portion 100a of the angle including one side of the angle 100 with the file 110 based on a time when the diffusion material 120a is inserted into the angle 100.

At this time, the angle 100 is made up of a cover 101 in which a portion 100a is transparent plastic or milky plastic, so that the diffusion material 120a is exposed through a portion 100a of the angle based on the time when the diffusion material 120a is inserted into the angle 100.

Referring back to FIG. 1, the lip hook 200 is provided in a form that can be cradled (or grounded) on the lips or gums of a subject during the root canal treatment, and may be provided at the other end of the body portion 300.

The lip hook 200 functions as a ground electrode and allows the root canal length to be measured through the handpiece 10 of an exemplary embodiment.

The body portion 300 is provided with a display device 310, a first switch 320, and a second switch 330.

The display device 310 is operated through a control module of the body portion 300 and displays position information and length information of a dental root end in real time.

It is preferable that the body portion 300 is provided with a communication module in order for the display device 310 to display the position information and length information of the dental root end in real time, and the communication module may be a short-range communication module for providing real-time the position information and length information of the dental root end, and the short-range communication module may be any one module selected from a Bluetooth module for Bluetooth communication, a ZigBee communication module, and a Wi-Fi communication module.

In addition, the display device 310 may display not only the position information and length information of the dental root end, but also the number of rotations (RPM) of the file 110 during the root canal treatment process.

The first switch 320 may be provided on one side of the body portion 300 to turn on/off the control module of the body portion 300, and may be input with a signal for the operator to turn on/off the control module of the body portion.

The second switch 330 may be provided on the other side of the body portion 300 to turn on/off a battery of the body portion 300 to which the LED light source 410, the file 110, and the lip hook 200 are electrically connected to calculate the position information and length information of the dental root end, and may be input with the signal for the operator to turn on/off the battery of the body portion 300.

In the present invention, it is described that the body portion 300 includes the first and second switches 320 and 330, but the present invention is not limited thereto, but a circuit which may include only at least one switch of the first and second switches 320 and 330, and turn on/off the control module and the battery of the body portion 300 through the switch may be configured.

Meanwhile, the battery of the body portion 300 supplies power to each of the LED light source 410, the file 110, and the lip hook 200, and to this end, the body portion 300 includes multiple connectors for electrically conducting the battery and each of the LED light source 410, the file 110, and the lip hook 200.

Furthermore, since the battery of the body portion 300 requires charging after consuming power, it is preferable that the body portion 300 is provided with a hub for charging the power of the battery, and a location of the hub is not limited, but in the present invention, the hub may be provided on the other end of the body portion 300 with the lip hook 200.

The body portion 300 is provided with a protruding member 340 having a first terminal connector 341 into which a first terminal provided on the other side of the angle 100 is to be inserted.

The first terminal connector 341 allows the first terminal and the connector to be electrically connected when the first terminal of the angle 100 is inserted, allowing the file 110 to serve as a connection electrode.

The protruding member 340 is provided on one end of the body portion 300 in a form that can be fitted into the other portion 100b of the angle 100, so that when the body portion is inserted into the other portion 100b of the angle, the angle 100 and the body portion 300 are connected.

Furthermore, a second terminal connector into which the second terminal provided at one side of the lip hook 200 is to be inserted is provided on the other end of the body portion 300 in addition to the first terminal connector 341.

The second terminal connector allows the second terminal and the connector to be electrically connected when the second terminal of the lip hook 200 is inserted, allowing the lip hook 200 to serve as a ground electrode.

As such, when the file 110 serves as the connection electrode and the lip hook 200 serves as the ground electrode, the file 110 may measure an impedance value which is varied as approaching from a tooth surface to the dental root end, and the control module of the body portion 300 changes the color of the LED light irradiated from the LED light source according to position information and length information of the dental root end acquired through the impedance value measured by the file 110.

The LED light source 410 may be constituted by multiple LED light sources that irradiate the LED light on one end of the body portion 300, and irradiate LED light of different colors so that the color of the LED light is changed according to the position information and length information of the dental root end acquired by the control module of the body portion 300.

Here, the LED light irradiated by the LED light source 410 is preferably diffused through various types of diffusion materials 120 and provided to the operator, through which the operator may determine the length of the root canal through the angle 100 viewed during the root canal treatment without moving his/her sight to a separate display device during the root canal treatment.

Hereinafter, a handpiece 10 according to another exemplary embodiment of the present invention, in which the LED light source 410 is provided in the LED module 400 as a separate member other than one end of the body portion 300 will be described in detail.

Furthermore, the handpiece 10 according to another exemplary embodiment of the present invention is provided with the angle 100, the lip hook 200, and the body portion 300 to overlap with the handpiece 10 of the exemplary embodiment, so the description of the angle 100, the lip hook 200, and the body portion 300 will be omitted for convenience.

Figure 4:
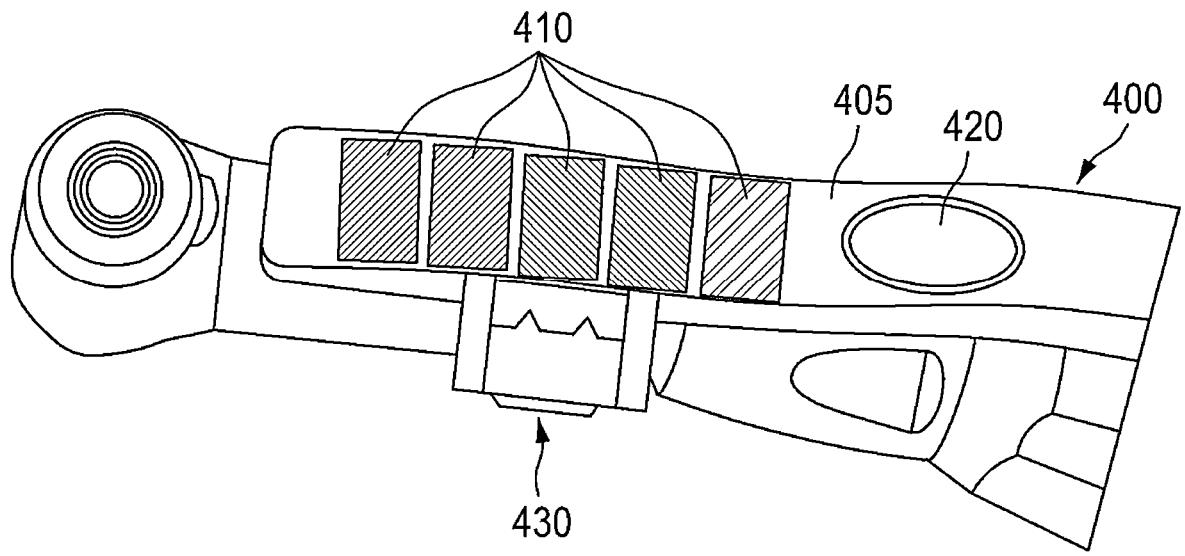
FIG. 4 is an explanatory diagram for describing an LED module provided in a handpiece with a root canal length measurement function according to another exemplary embodiment of the present invention.
Figure 5:
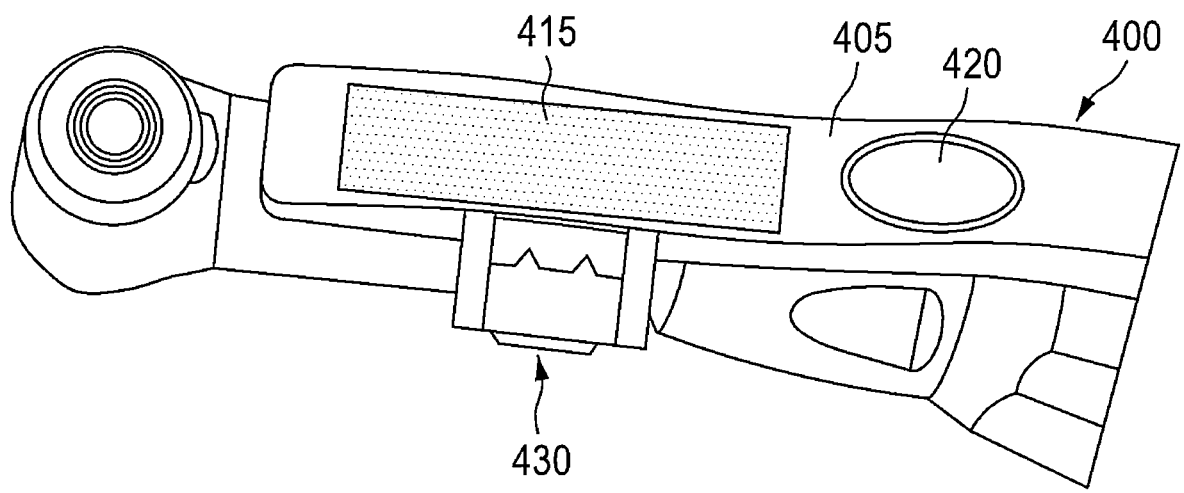
FIG. 5 is an explanatory diagram for describing an electricity supply method of the LED module according to another exemplary embodiment of the present invention.

FIG. 4 is an explanatory diagram for describing an LED module provided in a handpiece with a root canal length measurement function according to another exemplary embodiment of the present invention, and FIG. 5 is an explanatory diagram for describing an electricity supply method of the LED module according to another exemplary embodiment of the present invention.

Referring to FIGS. 4 and 5, the LED module 400 is preferably electrically connected to the battery of the body portion 300 through the connector so that the LED light source 410 operates, and a main body 405 is provided to include the LED light source 410.

The main body 405 includes an operating switch 420 which is to operate the LED light source 410, a band portion 430 which is to be attached to the angle 100, and a third terminal 440 for electrically conducting the LED light source 410 with the battery of the body portion 300, in addition to the LED light source 410.

The operating switch 420 plays the same role as the second switch 330 which operates the LED light source 410 when the signal is input by the operator.

Furthermore, the operating switch 420 may improve a problem of the second switch 330, and the problem of the second switch 330 is that it is difficult to input the signal into the second switch 330 of the body portion 300 through a general gripping method of the handpiece 10 in which the operator grips the angle 100 with the thumb, index finger, and middle finger during the root canal treatment.

In contrast, the operating switch 420 has an advantage in that it is easy to input the signal through the index finger, etc. of the operator while the operator grips the angle 100 during the root canal treatment process.

As illustrated in FIG. 5, the band portion 430 allows the main body 405 to surround an outer peripheral surface of the angle 100, which is in close contact with the outer peripheral surface of the angle 100 based on the time when the third terminal 440 is inserted into a third terminal connector provided in the body portion 300 to fix the LED module 400, which allows an electric connection between the third terminal 440 and the connector to be strengthened.

As illustrated in FIG. 4, in the LED module 400, the multiple LED light sources 410 may be provided as an equalizer type in which only an LED light source irradiating LED light of a color according to the position information and length information of the dental root end acquired by the control module of the body portion 300 operates, and which is divided into one or more regions based on a color of LED light to be irradiated.

In the present invention, the multiple LED light sources 410 may irradiate LED light having at least one color of red, yellow, and blue according to the position information and length information of the dental root end.

That is, in the present invention, the LED module 400 may be provided as an equalizer type in which the multiple LED light sources 410 are divided into red, yellow, and blue regions.

However, the LED module 400 is not limited to the multiple LED light sources 410 being the equalizer type, and the design may be changed variously by a designer, and a design change example of the LED module 400 is as follows.

Figure 6A:
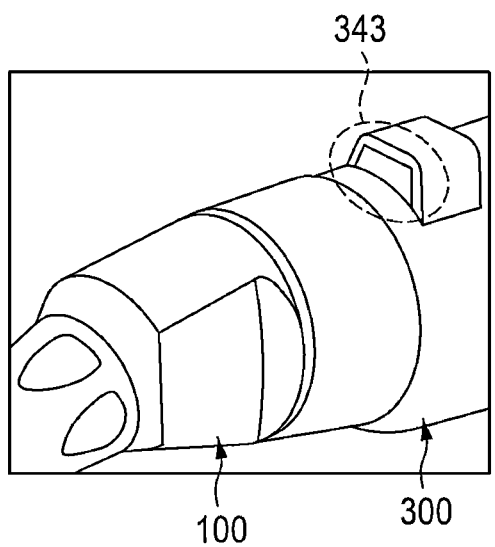
FIG. 6 is an explanatory diagram for describing an LED module whose design is changed in FIG. 4.
Figure 6B:
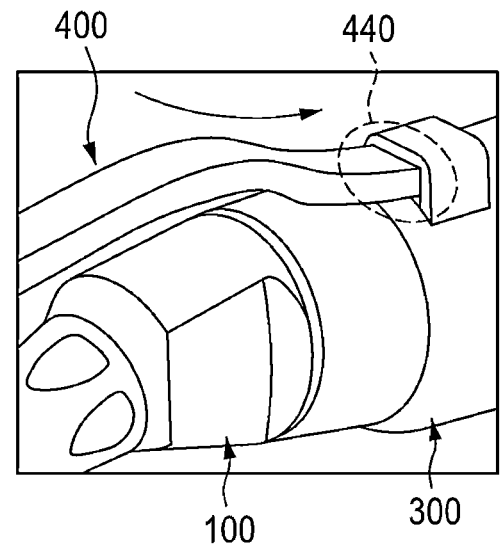

FIG. 6 is an explanatory diagram for describing an LED module whose design is changed in FIG. 4.

Referring to FIG. 6, the LED module 400 is provided in a form in which multiple LED light sources 410 are inserted into a panel 415 provided in the main body 405, and the multiple LED light sources 410 are inserted into the panel 415, and only the LED light source that irradiates LED light of a color according to the position information and length information of the dental root end acquired by the control module of the body portion 300 may operate.

Hereinafter, the types of colors of LED light irradiated by the LED light source 410 will be described in detail based on the position information of the dental root end during the root canal treatment process.

Figure 7:
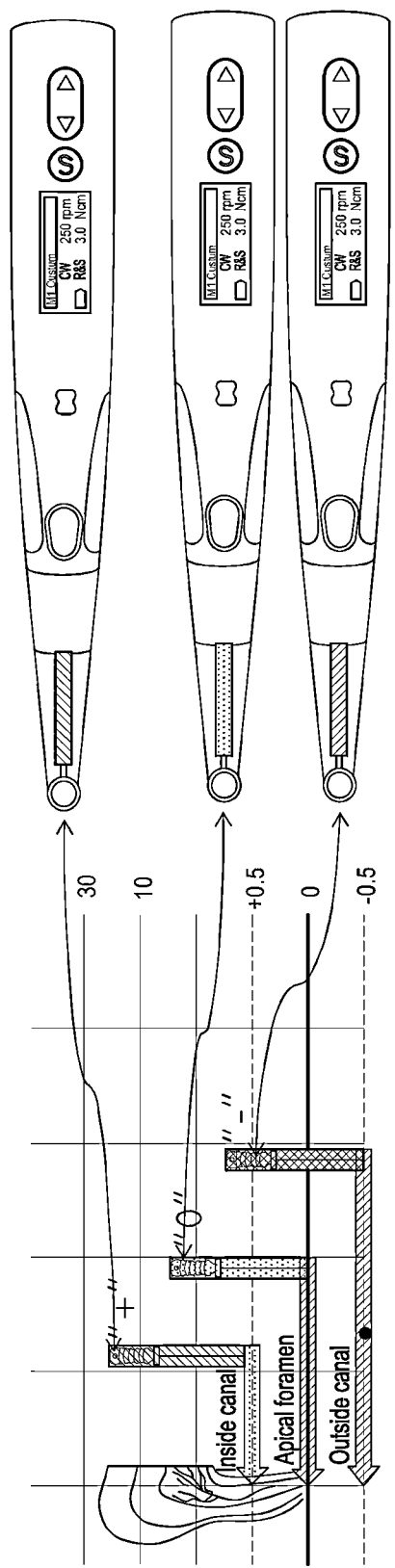
FIG. 7 is a use state diagram of the handpiece with a root canal length measurement function according to the present invention.

FIG. 7 is a use state diagram of the handpiece with a root canal length measurement function according to the present invention.

Referring to FIG. 7, the LED light source 410 may radiate blue LED light when the end of the file 110 enters the root canal during the root canal treatment process, irradiate yellow LED light when the end of the file 110 reaches apical foramen, and irradiate red LED light when the end of the file 110 passes (or penetrates) the apical foramen.

That is, in the root canal treatment process using the handpiece 10 of the present invention, it is preferable to insert the file 110 until the yellow LED light is irradiated after the blue LED light is irradiated from the LED light source 410.

Detailed description of the preferred exemplary embodiments of the present invention disclosed as described above are provided so as for those skilled in the art to implement and execute the present invention. The present invention has been described with reference to the preferred exemplary embodiments, but those skilled in the art will understand that the present invention can be variously modified and changed without departing from the scope of the present invention. For example, those skilled in the art may use the respective components disclosed in the exemplary embodiments by combining the respective components with each other. Therefore, the present invention is not limited to the exemplary embodiments described herein, but intends to grant the widest range which is coherent with the principles and new features disclosed herein.

The present invention may be embodied in other specific forms without departing from the technical idea and essential characteristics of the present invention. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention. The present invention is not limited to the exemplary embodiments described herein, but intends to grant the widest range which is coherent with the principles and new features presented herein. Further, the claims that are not expressly cited in the claims are combined to form an exemplary embodiment or be included in a new claim by an amendment after the application.

The invention claimed is:

1. A handpiece with a root canal length measurement function, comprising:
   an angle having one side provided with a root canal treatment file for removing dental pulp inside a root canal and for expanding the root canal;
   a lip hook provided such that the lip hook can be cradled on subject's lips;
   an LED module provided with an LED light source; and
   a body portion electrically connected to the file through a first terminal connector, into which a first terminal provided on the other side of the angle is to be inserted, and electrically connected to the lip hook through a second terminal connector, into which a second terminal of the lip hook is to be inserted, and electrically connected to the LED module through a third terminal connector, into which a third terminal of the LED module is to be inserted,
   wherein the body portion includes:
   multiple connectors for electrically connecting a battery, and the LED light source, the file, and the lip hook; and
   a control module for controlling operations of the battery such that a color of LED light emitted by the LED light source changes according to position information and length information of a dental root end, which are acquired by measuring an impedance value that varies as the file approaches from a tooth surface to the dental root end, and
   the LED module includes,
   wherein the LED Light source is constituted by multiple LED light sources that irradiate LED light of different colors so that the color of the LED light is changed according to the position information and length information of the dental root end, and
   the multiple LED light sources may be provided as an equalizer type in which only an LED light source irradiating LED light of a color according to the position information and length information of the dental root end operates, and which is divided into one or more regions based on the color of LED light to be irradiated,
   a main body including an operating switch which is to operate the LED light source; and
   a band portion for allowing the main body to surround an outer peripheral surface of the angle, which is in close contact with the outer peripheral surface of the angle based on a time when the third terminal is inserted into the third terminal connector.

2. A handpiece with a root canal length measurement function, comprising:
   an angle having one side provided with a root canal treatment file for removing dental pulp inside a root canal and for expanding the root canal;
   a lip hook provided such that the lip hook can be cradled on subject's lips;
   an LED module provided with an LED light source; and
   a body portion electrically connected to the file through a first terminal connector, into which a first terminal provided on the other side of the angle is to be inserted, and electrically connected to the lip hook through a second terminal connector, into which a second terminal of the lip hook is to be inserted, and electrically connected to the LED module through a third terminal connector, into which a third terminal of the LED module is to be inserted,
   wherein the body portion includes:
   multiple connectors for electrically connecting a battery, and the LED light source, the file, and the lip hook; and
   a control module for controlling operations of the battery such that a color of LED light emitted by the LED light source changes according to position information and length information of a dental root end, which are acquired by measuring an impedance value that varies as the file approaches from a tooth surface to the dental root end, and the LED module includes, wherein the LED Light source is constituted by multiple LED light sources that irradiate LED light of different colors so that the color of the LED light is changed according to the position information and length information of the dental root end, and in the multiple LED light sources, only an LED light source irradiating the LED light of the color according to the position information and length information of the dental root end operates, and the LED light of the color according to the position information and length information of the dental root end is irradiated through a panel into which the multiple LED light sources are inserted, a main body including an operating switch which is to operate the LED light source; and a band portion for allowing the main body to surround an outer peripheral surface of the angle, which is in close contact with the outer peripheral surface of the angle based on a time when the third terminal is inserted into the third terminal connector.

3. The handpiece with a root canal length measurement function of claim 1, wherein the body portion includes:
   a display device operating through the control module, and displaying the position information and length information of the dental root end in real time;
   a communication module providing the position information and length information of the dental root end to the display device in real time; and
   multiple switches for turning on/off the control module and the battery.

4. The handpiece with a root canal length measurement function of claim 2, wherein the body portion includes:
   a display device operating through the control module, and displaying the position information and length information of the dental root end in real time;
   a communication module providing the position information and length information of the dental root end to the display device in real time; and
   multiple switches for turning on/off the control module and the battery.

\* \* \* \* \*